UNITED STATES PATENT OFFICE 2,200,525

ANTIOXIDANT

Charles F. Winans, Akron, Ohio, assignor to Wingfoot Corporation, Wilmington, Del., a corporation of Delaware No Drawing. Application December 23, 1936, Serial No. 117,339

12 Claims. (Cl. 260—800)

This invention relates to a method of preserving rubber. More particularly it relates to a method of preserving rubber by the use of secondary amines containing a furfuryl group.

Many compounds have been suggested for retarding the natural deterioration of rubber. This deterioration is due to the action of air, heat, light, flexing, etc. on the rubber so that it gradually loses its tensile strength and other characteristic properties. Materials used to inhibit this deterioration are customarily termed antioxidants or age resisters and many such compounds having beneficial effects on rubber are known to the art. However, in accordance with the present invention, it has been discovered that secondary amines having the formula R—NH—R' in which R is a furfuryl group and R' is an aromatic group, are particularly useful for this purpose. The furfuryl group may be either the alpha or beta modification but the alpha type compound is the more readily available commercially and constitutes the preferred form. The aromatic substituent may be any aryl group or certain substituted forms. For example, it may be phenyl, naphthyl, etc. It may contain alkyl substituents such as methyl, propyl, butyl, allyl, ethyl, etc.; it may contain aryl or aralkyl groups; it may contain halogens such as chlorine, bromine, etc.; it may contain amino groups, particularly secondary amino groups. In fact, it may contain any substituent which it is recognized in the antioxidant art does not adversely affect the antioxidant properties. However, the compound should preferably contain no strongly acidic groups such as $HSO_3$, $COOH$, $NO_2$, etc. In some cases these latter substituents merely lessen the effect of the antioxidant, but in any event they are not desirable. Consequently, in speaking of antioxidants or age resisters in connection with this invention, it is intended to refer to compounds which do not contain these undesired groups but which may contain substituents well known to be non-detrimental.

The preparation of the compounds of the invention may be illustrated by the following example showing the preparation of alpha furfuryl para amino phenol. To a solution of 109 grams of para amino phenol in 1200 ml. of hot alcohol were added 96 grams of alpha furfural. A red color developed. On cooling, 122 grams of crystals melting at 187–188° C. (the same being furfural para amino phenol) were obtained. Of this material 0.27 mol was hydrogenated in alcoholic solution under a hydrogen pressure of approximately 100–150 atmospheres for a period of one hour at a maximum temperature of 75° C. using a nickel catalyst prepared by the method of U. S. Patent 1,628,190. The reduction of the carbon-nitrogen double linkage was practically quantitative. A 99% yield of alpha furfuryl para amino phenol (M. P. 108–110° C.) being obtained. The product upon analysis was found to contain 7.35% nitrogen as compared with the theoretical nitrogen content of alpha furfuryl para amino phenol of 7.41%. The above reactions may be represented by the following equations.

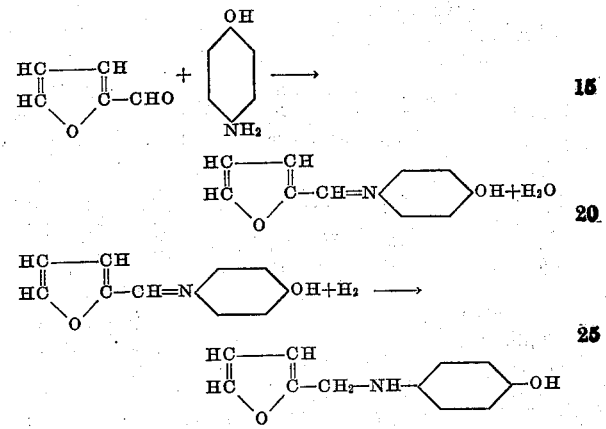

By substituting beta furfural for the alpha furfural or other amines for the para amino phenol of the foregoing example, other compounds coming within the scope of the invention may be similarly prepared. Among these other amines are aniline, para phenetidine, ortho toluidine, the AR tetrahydronaphthylamines, ortho amino phenol, xylidine, tolidine, ortho and para anisidine, para chlor aniline, alpha naphthylamine, beta naphthylamine.

Thus, other compounds coming within the invention are N-furfuryl phenyl-amine, N-furfuryl para phenetidine, N-furfuryl orthochlorphenylamine, N-furfuryl beta-naphthylamine, N-furfuryl paraphenylene diamine, para furfuryl amino diphenylamine, etc.

The efficacy of the new class of antioxidants was tested by incorporating alpha furfuryl para amino phenol in a rubber stock made up according to the following formula:

| | |
|---|---|
| Extracted pale crepe | 100 |
| Zinc oxide | 5 |
| Sulfur | 3 |
| Hexamethylene tetramine | 1 |
| Stearic acid | 1.5 |
| Antioxidant | 1 |

Samples of this stock were cured and subjected to low temperature ageing (50° C.) for six days under an oxygen pressure of 150 pounds per square inch. Samples tested before and after ageing showed the following results:

| Cure | Before ageing | | | | After ageing | | | | Wt. inc. | Ratio |
|---|---|---|---|---|---|---|---|---|---|---|
| | Tens. | Elong. | 500% | 700% | Tens. | Elong. | 500% | 700% | | |
| | | | | | | | | | | Per cent |
| 35/285 | 106 | 800 | 19 | 59 | 136 | 770 | 26 | 95 | | |
| 50 | 123 | 740 | 25 | 90 | 130 | 695 | 34 | | | 109 |
| 70 | 144 | 715 | 35 | 134 | 143 | 675 | 43 | | .02 | |

The ratio referred to is that of tensile strength after ageing to that before ageing, the result indicating no loss of tensile strength.

The antioxidant was also tested by subjection to high temperature ageing. This test was carried out in a rubber stock having the following formula:

| | |
|---|---|
| Smoked sheet | 100 |
| Zinc oxide | 5.5 |
| Carbon black | 43 |
| Sulfur | 2.75 |
| Stearic acid | 4 |
| Pine tar | 5.7 |
| 2-mercaptobenzothiazole | 1.15 |
| Antioxidant | 1 |

Samples of this stock were cured and aged for seven hours at a temperature of 114° C. under an air pressure of 80 pounds per square inch and gave the following results.

| Cure | Before ageing | | | | After ageing | | | | Ratio |
|---|---|---|---|---|---|---|---|---|---|
| | Tens. | Elong. | 300% | 500% | Tens. | Elong. | 300% | 500% | |
| | | | | | | | | | Per cent |
| 35/260 | 298 | 695 | 60 | 162 | 190 | 445 | 116 | | |
| 50 | 325 | 690 | 75 | 190 | 176 | 390 | 128 | | |
| 70 | 320 | 625 | 92 | 220 | 170 | 350 | 140 | | |
| 100 | 337 | 630 | 104 | 237 | 148 | 310 | 146 | | 51 |
| 140 | 302 | 555 | 111 | 260 | 120 | 250 | | | |

These figures compare very favorably with the requirements of a commercial antioxidant, demonstrating a very good preservative effect.

Although only the preferred forms of the invention have been described in detail, it will be apparent to those skilled in the art that various modifications may be made therein without departing from the spirit of the invention or the scope of the appended claims, in which it is intended to cover, by suitable expression, all features of patentable novelty residing in the invention.

I claim:

1. The method of preserving rubber which comprises vulcanizing the same in the presence of a compound selected from the group consisting of secondary N-furfuryl N-aryl amines and secondrary N-furfuryl N-aryl amines in which the aryl radical has attached thereto at least one substituent selected from the group consisting of alkyl, aryl, aralkyl, halogen, amino and hydroxyl groups.

2. The method of preserving rubber which comprises vulcanizing the same in the presence of a secondary N-furfuryl N-aryl amine.

3. The method of preserving rubber which comprises vulcanizing the same in the presence of N-furfuryl aniline.

4. The method of preserving rubber which comprises vulcanizing the same in the presence of N-furfuryl p-amino phenol.

5. The method of preserving rubber which comprises vulcanizing the same in the presence of a secondary N-furfuryl naphthylamine.

6. The method of preserving rubber which comprises vulcanizing the same in the presence of N-furfuryl beta naphthylamine.

7. A rubber product which has been vulcanized in the presence of a compound selected from the group consisting of secondary N-furfuryl N-aryl amines and secondary N-furfuryl N-aryl amines in which the aryl radical has attached thereto at least one substitutent selected from the group consisting of alkyl, aryl, aralkyl, halogen, amino and hydroxyl groups.

8. A rubber product which has been vulcanized in the presence of a secondary N-furfuryl N-aryl amine.

9. A rubber product which has been vulcanized in the presence of N-furfuryl aniline.

10. A rubber product which has been vulcanized in the presence of N-furfuryl p-amino phenol.

11. A rubber product which has been vulcanized in the presence of a secondary N-furfuryl naphthylamine.

12. A rubber product has been vulcanized in the presence of N-furfuryl beta naphthylamine.

CHARLES F. WINANS.